United States Patent
Oroskar et al.

(10) Patent No.: US 9,386,563 B1
(45) Date of Patent: *Jul. 5, 2016

(54) COORDINATION OF CODEC CONSISTENCY BASED ON CROSS-CARRIER ASSIGNMENT

(71) Applicant: Sprint Spectrum L.P., Overland Park, KS (US)

(72) Inventors: Siddharth S. Oroskar, Overland Park, KS (US); Maulik Shah, Overland Park, KS (US); John W. Prock, Raymore, MO (US); Kurt M. Landuyt, Parkville, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 489 days.

This patent is subject to a terminal disclaimer.

(21) Appl. No.: 13/860,579

(22) Filed: Apr. 11, 2013

(51) Int. Cl.
*G06F 11/30* (2006.01)
*H04W 72/04* (2009.01)

(52) U.S. Cl.
CPC .................. *H04W 72/0406* (2013.01)

(58) Field of Classification Search
CPC .................. H04B 7/2628; H04B 2201/70701; H04B 2201/70718
See application file for complete search history.

(56) References Cited

U.S. PATENT DOCUMENTS

| | | | |
|---|---|---|---|
| 6,069,883 A | 5/2000 | Ejzak et al. | |
| 6,088,335 A | 7/2000 | I et al. | |
| 6,349,208 B1 | 2/2002 | Sexton et al. | |
| 6,584,098 B1 | 6/2003 | Dutnall | |
| 6,665,538 B1 | 12/2003 | Hunte | |
| 6,714,514 B1 * | 3/2004 | Espax | H04B 7/0689 370/230 |
| 6,798,786 B1 | 9/2004 | Lo et al. | |
| 7,031,703 B1 | 4/2006 | Graf et al. | |
| 7,120,447 B1 | 10/2006 | Chheda et al. | |
| 7,200,171 B2 | 4/2007 | Forbes et al. | |
| 7,254,121 B2 | 8/2007 | Kim et al. | |
| 7,328,027 B1 | 2/2008 | Mangal | |
| 7,668,134 B2 | 2/2010 | Hosein et al. | |
| 7,688,745 B1 | 3/2010 | Hurtta et al. | |
| 7,738,427 B1 | 6/2010 | Yew et al. | |
| 7,924,764 B2 | 4/2011 | Moorti et al. | |
| 8,107,961 B1 | 1/2012 | Vargantwar et al. | |
| 8,160,611 B1 | 4/2012 | Oroskar | |
| 8,213,953 B1 | 7/2012 | Mangal | |

(Continued)

OTHER PUBLICATIONS

Unpublished U.S. Appl. No. 13/595,668 entitled "Managing Codec Consistency Across a Communication Session" filed Aug. 27, 2012 in the name of Sachin R. Vargantwar.

(Continued)

*Primary Examiner* — Andrew Lai
*Assistant Examiner* — Zhiren Qin

(57) ABSTRACT

A method and system is disclosed for coordinating codec consistency based on cross-carrier assignments. When a new voice call (or other communication session) is set up between access terminals in a wireless communication system, a network device, such a base station, can determine a respective maximum coding rate supported on carrier frequencies of both an originating access terminal and a terminating access terminal. The network device can then select a coding rate that best accommodates the respective maximum coding rates. Each access terminal may then be instructed to use the selected coding rate for the new call (or communication session). Either or both access terminals may also execute a frequency handoff to a carrier frequency that supports the selected coding rate, if necessary.

17 Claims, 5 Drawing Sheets

(56) References Cited

U.S. PATENT DOCUMENTS

| | | |
|---|---|---|
| 8,254,930 B1 | 8/2012 | Mauer et al. |
| 8,442,012 B1 | 5/2013 | Singh et al. |
| 8,457,069 B1 | 6/2013 | Vargantwar et al. |
| 8,457,633 B1 | 6/2013 | Oroskar |
| 8,483,699 B1 | 7/2013 | Oroskar |
| 8,644,178 B1 | 2/2014 | Oroskar |
| 2003/0007466 A1 | 1/2003 | Chen |
| 2003/0031200 A1 | 2/2003 | Lehtimaki |
| 2003/0236909 A1 | 12/2003 | Chu |
| 2004/0037312 A1 | 2/2004 | Spear |
| 2004/0043751 A1* | 3/2004 | Amalfitano ........... H04W 76/02 455/403 |
| 2006/0182068 A1 | 8/2006 | Stopler |
| 2006/0280159 A1 | 12/2006 | Bi et al. |
| 2007/0053446 A1* | 3/2007 | Spilo .................... H04L 1/0003 375/259 |
| 2007/0058623 A1 | 3/2007 | Moorti et al. |
| 2008/0130511 A1* | 6/2008 | Koo ....................... G10L 19/24 370/252 |
| 2009/0154658 A1* | 6/2009 | Kasper ................. H04L 1/0014 379/32.01 |
| 2009/0209300 A1 | 8/2009 | Furbeck |
| 2012/0020248 A1 | 1/2012 | Granlund et al. |
| 2012/0028642 A1* | 2/2012 | Schliwa-Bertling . C12N 5/0686 455/436 |
| 2012/0224561 A1 | 9/2012 | Fang et al. |
| 2012/0307921 A1 | 12/2012 | Ulmer-Moll et al. |
| 2013/0044617 A1* | 2/2013 | Boixadera ......... H04W 56/0045 370/252 |
| 2013/0109387 A1 | 5/2013 | Tinnakornsrisuphap et al. |

OTHER PUBLICATIONS

Unpublished U.S. Appl. No. 13/595,632, entitled "Maintaining Codec Consistency Across a Communication Session" filed Aug. 27, 2012 in the name of Sachin R. Vargantwar.

Unpublished U.S. Appl. No. 13/626,497, entitled "Managing Codec Consistency Across a Communication Session" filed Sep. 25, 2012 in the name of Siddharth S. Oroskar.

Unpublished U.S. Appl. No. 13/647,536, entitled "Coordination of Codec Assignment and Radio Configuration in Wireless Communications" filed Oct. 9, 2012 in the name of Siddharth S. Oroskar.

Unpublished U.S. Appl. No. 13/852,349, entitled "Coordination of Codec Consistency Across Wireless Coverage Areas" filed Mar. 28, 2013 in the name of Siddharth S. Oroskar.

Office Action in U.S. Appl. No. 13/595,668 mailed May 19, 2014.

* cited by examiner

COORDINATION OF CODEC CONSISTENCY BASED ON CROSS-CARRIER ASSIGNMENT

BACKGROUND

In a typical cellular radio communication system (wireless communication system), an area is divided geographically into a number of cell sites, each defined by a radio frequency (RF) radiation pattern from a respective base transceiver station (BTS) antenna. The base station antennas in the cells are in turn coupled to a base station controller (BSC), which is then coupled to a telecommunications switch or gateway, such as a mobile switching center (MSC) and/or a packet data serving node (PDSN) for instance. The switch or gateway may then be coupled with a transport network, such as the PSTN or a packet-switched network (e.g., the Internet).

When an access terminal (such as a cellular telephone, pager, or appropriately equipped portable computer, for instance) is positioned in a cell, the access terminal (also referred to herein by "AT") communicates via an RF air interface with the BTS antenna of the cell. Consequently, a communication path is established between the AT and the transport network, via the air interface, the BTS, the BSC and the switch or gateway. Functioning collectively to provide wireless (i.e., RF) access to services and transport in the wireless communication system, the BTS, BSC, MSC, and PDSN, comprise (possibly with additional components) what is typically referred as a Radio Access Network (RAN).

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS, or by respective BTS antennas. These sectors can be referred to as "physical sectors," since they are physical areas of a cell site. Therefore, at any given instant, an access terminal in a wireless network will typically be positioned in a given physical sector and will be able to communicate with the transport network via the BTS serving that physical sector.

As an access terminal moves between wireless coverage areas of a wireless communication system, such as between cells or sectors, or when network conditions change or for other reasons, the AT may "hand off" from operating in one coverage area to operating in another coverage area. In a usual case, this handoff process is triggered by the access terminal monitoring the signal strength of various nearby available coverage areas, and the access terminal or the BSC (or other controlling network entity) determining when one or more threshold criteria are met. For instance, the AT may continuously monitor signal strength from various available sectors and notify the BSC when a given sector has a signal strength that is sufficiently higher than the sector in which the AT is currently operating. The BSC may then direct the AT to hand off to that other sector. By convention, an AT is said to handoff from a "source" cell or sector (or other coverage area) to a "target" cell or sector.

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). Under IS-2000, packet-data communications may be referred to as "1×-RTT" communications, also abbreviated as just "1×." However, since IS-2000 supports both circuit voice and packet data communications, the term 1× (or 1×-RTT) is sometimes used to more generally refer the IS-2000 air interface, without regard to the particular type of communication carried. Packet-data communications under IS-856 are conventionally referred to as "EVDO" communications, also abbreviated as just "DO." Access terminals may be capable of communication with either or both protocols, and may further be capable of handing off between them, in addition to being able to hand off between various configurations of coverage areas.

OVERVIEW

Under IS-2000 (and other versions of CDMA) and IS-856, communications from the wireless communication system (or the "wireless network") to an access terminal are carried on a "forward link" of the air interface, and communications from an access terminal to a base station are carried on a "reverse link" of the air interface. For IS-2000, data sent on both the forward and reverse links are assembled into units called frames, which contain data encoded for transmission to or from the access terminal (and correspondingly, from or to the base station), and are transmitted at regular intervals (corresponding to a frame rate), typically 20 milliseconds in duration (although other transmission intervals can be used). The receiving entity (e.g., access terminal on the forward link, and the wireless network—or a network device therein—on the reverse link) decodes the encoded data in received frames to recover the original data.

Encoding typically involves compression of data from an input bit rate to an output bit rate, where the output bit rate usually requires reduced transmission bandwidth (or data storage space) compared with the input bit rate. The amount of compression achieved depends on the compression scheme or algorithm applied, including whether or not any information in the input data is lost or modified in the process (e.g., rendered in some form of analytic approximation in order to accommodate reduced "volume"). The decoding process essentially reverses the encoding process, including decompressing the compressed data. The fidelity of the recovered data to the original data depends, in part, on how well the compression-decompression scheme compensates for lost or modified information, as well as the ability of the scheme to correct for degradation due to imperfect transmission (e.g., errors, noise, etc.).

The implementation of an encoding-decoding algorithm is referred to as a "codec" (for coder/decoder), and usually takes the form of a device (e.g., a digital signal processor, or the like) and/or computer-executable instructions (e.g., software, firmware, etc.). Different codecs may implement different encoding-decoding schemes, including the ability to achieve different levels of compression and/or different degrees of protection against transmission errors, and a given codec may have different modes of operation that similarly accommodate different levels of compression and/or different degrees of protection against transmission errors. Codecs typically comply with one or another industry standard in order to help insure interoperability.

For example, CDMA 2000 Spread Spectrum Systems (also referred to as CDMA2000 1×) and CDMA 2000 Spread Spectrum Systems Revision E (also referred to as CDMA2000 1× Advanced) specify support for a family of codecs referred to under the umbrella of "Enhanced Variable Bitrate Codec," or "EVRC." More particularly, "EVRC-B" (and upgrade to EVRC) is a speech codec that defines eight levels of average data rates that may be selected for encoding on a forward link to, and/or a reverse link from, an access terminal engaging in a voice call. Generally, a higher the data rate requires higher transmission power, but provides the better the voice quality, and vice versa. The eight levels are referred to as "capacity operating points" or "COPs," and are labeled with parameter values 0 through 7, in order from highest to lowest average data rate. When a given call is set up, the RAN (or RAN element, such as a BSC) at the originating end, or "near end," of the call selects a COP value based on capacity utilization of the sector in which the near-end access terminal is operating.

While EVRC-B provides for adjusting the COP value as the access terminal moves between sectors that have differing capacity loading conditions during the course of a call, in practice a changing COP value may result in changing voice quality that a user finds distracting or annoying. A conventional approach to addressing the possible change in voice quality due to changing COP values is to simply fix a COP value for the duration of a call, without regard to network loading conditions in the different cells or sectors. However, assigning a COP value based only on loading conditions the originating cell or sector may have a negative impact on network operations, especially if the originating access terminal subsequently traverses cells or sectors in which higher loading conditions makes support of originally-assigned COP value difficult.

A related issue can arise in connection with a voice call (or more generally, a communication session) placed to a "far-end" access terminal. Specifically, the data rate or encoding rate supported at the far end of the call may be different from that supported at the near end. For instance, if the far-end AT is in a lightly loaded sector, it may be able to support a higher data rate than the near-end AT, and vice versa. Further still, for wireless communication systems that employ multiple carrier frequencies, it may be the case that a loading conditions and corresponding supported encoding rates (e.g., as signified by COP values) are more favorable on one carrier than another at the near end, far end, or both.

However, under conventional operation, a COP value for a voice call is selected based on loading conditions on the carrier frequency of the access terminal at the near-end (originating end), without consideration of the data rates supported either by the far-end access terminal, or by other possible carrier frequencies at either end. As a result, conventional assignment of COP values can result in inefficient, and potentially wasteful, use of transmission capacity on forward and/or reverse links with access terminals in a wireless communication system. While the particular example above is directed to voice calls, the principles apply more generally to communication sessions for carrying voice and/or other forms of data. Accordingly, it would be desirable to be able to coordinate codec assignments across carrier frequencies at both the near and far ends of calls. By doing so, allocation of transmission capacity on forward and/or reverse links can be made in a manner that takes better account of system capacity and of near-end/far-end capacity coordination.

Hence in one respect, various embodiments of the present invention provide, in a radio access network (RAN) device of a wireless communication system, a method comprising: in response to receiving a request to set up a communication session between a first access terminal operating in a first wireless coverage zone and a second access terminal operating in a second wireless coverage zone, determining both (i) a first maximum air-interface coding rate from among air-interface coding rates supported on each of one or more carrier frequencies of an air interface of the first wireless coverage zone, and (ii) a second maximum air-interface coding rate from among air-interface coding rates supported on each of one or more carrier frequencies of an air interface of the second wireless coverage zone; determining a minimum air-interface coding rate from among the determined first maximum air-interface coding rate and the determined second maximum air-interface coding rate; and transmitting an instruction to each of the first access terminal and the second access terminal to use the determined minimum air-interface coding rate for air-interface communications for a duration of the communication session.

In another respect, various embodiments of the present invention provide, a radio access network (RAN) device of a wireless communication system comprising: one or more processors; memory accessible by the one or more processors; and computer-readable instructions stored in the memory that upon execution by the one or more processors cause the RAN device to carry out functions including: in response to receiving a request to set up a communication session between a first access terminal operating in a first wireless coverage zone and a second access terminal operating in a second wireless coverage zone, determining both (i) a first maximum air-interface coding rate from among air-interface coding rates supported on each of one or more carrier frequencies of an air interface of the first wireless coverage zone, and (ii) a second maximum air-interface coding rate from among air-interface coding rates supported on each of one or more carrier frequencies of an air interface of the second wireless coverage zone, determining a minimum air-interface coding rate from among the determined first maximum air-interface coding rate and the determined second maximum air-interface coding rate, and transmitting an instruction to each of the first access terminal and the second access terminal to use the determined minimum air-interface coding rate for air-interface communications for a duration of the communication session.

In yet another respect, various embodiments of the present invention provide, a non-transitory computer-readable medium having instructions stored thereon that, upon execution by one or more processors of a radio access network (RAN) device of a wireless communication network, cause the RAN device to carry out functions including: in response to receiving a request to set up a communication session between a first access terminal operating in a first wireless coverage zone and a second access terminal operating in a second wireless coverage zone, determining both (i) a first maximum air-interface coding rate from among air-interface coding rates supported on each of one or more carrier frequencies of an air interface of the first wireless coverage zone, and (ii) a second maximum air-interface coding rate from among air-interface coding rates supported on each of one or more carrier frequencies of an air interface of the second wireless coverage zone; determining a minimum air-interface coding rate from among the determined first maximum air-interface coding rate and the determined second maximum air-interface coding rate; and transmitting an instruction to each of the first access terminal and the second access terminal to use the determined minimum air-interface coding rate for air-interface communications for a duration of the communication session.

These as well as other aspects, advantages, and alternatives will become apparent to those of ordinary skill in the art by reading the following detailed description, with reference where appropriate to the accompanying drawings. Further, it should be understood that this summary and other descriptions and figures provided herein are intended to illustrate the invention by way of example only and, as such, that numerous

DETAILED DESCRIPTION

Example embodiments will be described by way of example with reference to Code Division Multiple Access ("CDMA") communications in general, and to IS-856 and IS-2000 (including CDMA2000 1× and CDMA2000 1× Advanced) communications in particular. As described below, IS-2000 applies to both circuit-cellular and packet-data communications, and is referred to herein as "conventional" CDMA communications. For voice communications, CDMA2000 1× and/or CDMA2000 1× Advanced may specify codec support according to EVRC, including EVRC-B, EVRC-WB, and EVRC-NW. IS-856 applies more exclusively to packet-data communications (including, e.g., real-time voice and data applications), and is referred to herein as "high rate" packet-data communications. It should be understood that example embodiments can apply to other wireless voice and data protocols including, without limitation, IS-95 and GSM, which, together with IS-856 and IS-2000 are considered herein, individually or in combination, to comprise a CDMA family of protocols.

Figure 1:
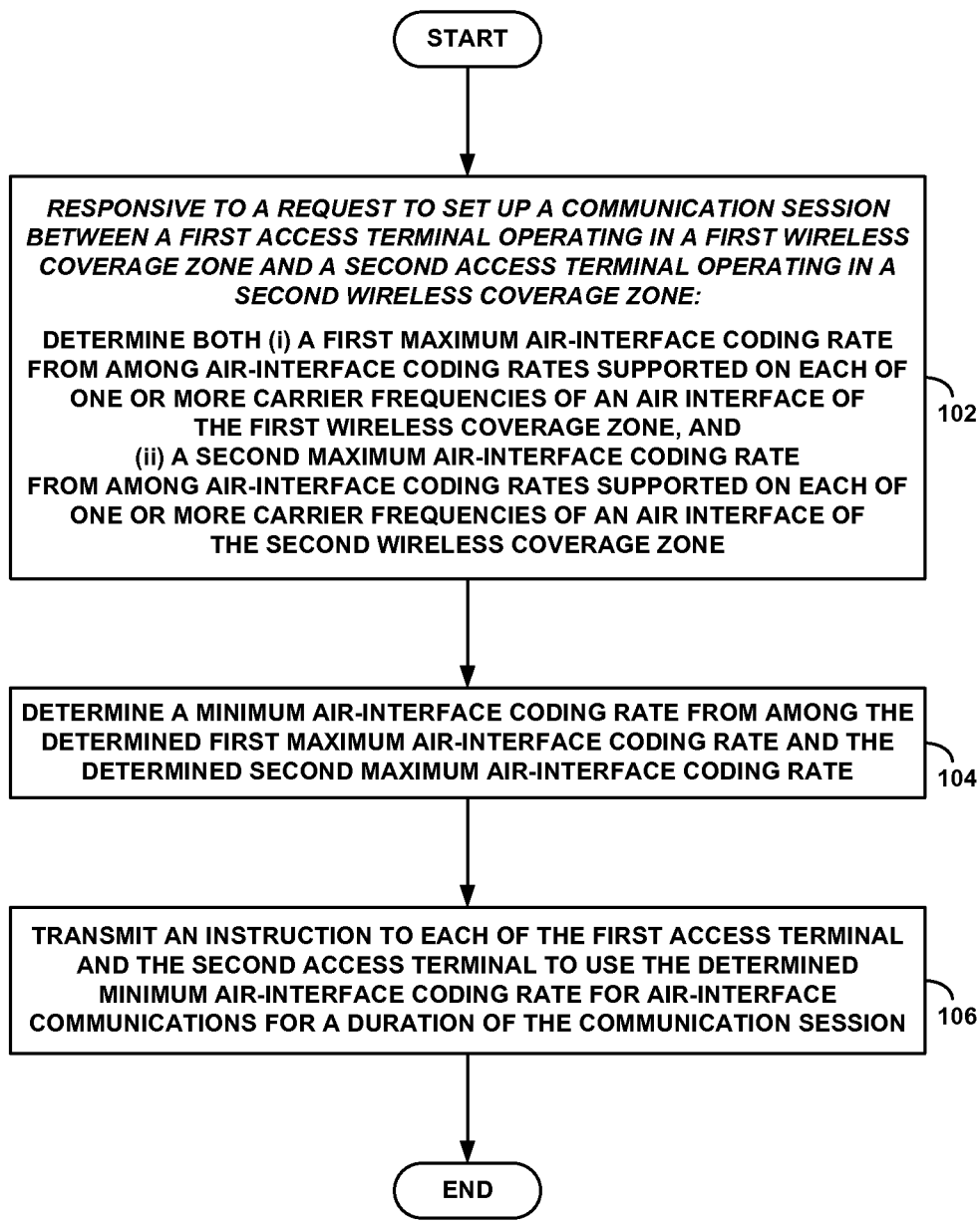
FIG. 1 is a flowchart illustrating an example method of coordinating codec consistency based on cross-carrier assignment, in accordance with example embodiments.

FIG. 1 is a flowchart illustrating an example method of coordinating codec consistency based on assignment across carrier frequencies, in accordance with example embodiments. In particular, the example method of FIG. 1 can account for aspects of end-to-end transmission capacity in codec selection. By way of example, the method could be carried out by a RAN device configured to operate according to a CDMA family of protocols, including at least CDMA2000 1×. The RAN device could be, for example, a base station, a BSC, or an MSC operating in a wireless communication system (or wireless communication network) that is also configured to operate according to a CDMA family of protocols. For purposes of the discussion herein, assignment across carrier frequencies may also be referred to as "cross-carrier assignment," and is take to apply to selection and assignment from among different carrier frequencies at the near and far end of a call (or other form of communication session).

At step 102, the RAN device responds to receiving a request to set up a communication session between a first access terminal operating in a first wireless coverage zone and a second access terminal operating in a second wireless coverage zone by determining air-interface coding rates supported at each end of the requested session. More specifically, the RAN device determines both (i) a first maximum air-interface coding rate from among air-interface coding rates supported on each of one or more carrier frequencies of an air interface of the first wireless coverage zone, and (ii) a second maximum air-interface coding rate from among air-interface coding rates supported on each of one or more carrier frequencies of an air interface of the second wireless coverage zone.

At step 104, the RAN device determines a minimum air-interface coding rate from among the determined first maximum air-interface coding rate and the determined second maximum air-interface coding rate. That is, the RAN device determines which of the first and second maximum air-interface coding rates is smaller. In the case that the first and second maximum air-interface coding rates are equal, then either rate (or both) can be considered to satisfy the minimum condition.

Finally, at step 106, the RAN device transmits an instruction to each of the first access terminal and the second access terminal to use the determined minimum air-interface coding rate for air-interface communications for a duration of the communication session. More specifically, both access terminals may transmit and receive at respective air-interface data rates determined, at least in part, by selectable coding rates. For a given call or communication session, the coding rate may be selected by the RAN device, based on loading conditions and/or RF conditions on each or one or more carrier frequencies at the time the call request is received, for example. The access terminals' coding rates for a given call or communication session may therefore be set via a command or instruction from the RAN device.

Example embodiments can accommodate various configurations. For example, the first and second wireless coverage zones could be the same. In this instance, the "first wireless coverage zone" and "second wireless coverage zone" may be considered alternative designations of a single wireless coverage zone. As an example, the "first wireless coverage zone" and "second wireless coverage zones" could both refer to a single sector under the control of a BTS. The BTS, in turn, could be under the control of the RAN device. Alternatively, the BTS and the RAN device could be one and the same.

Also in accordance with example embodiments, the first and second wireless coverage zones could be different. Again by way of example, the "first wireless coverage zone" and "second wireless coverage zone" could each be a different sector. Each of the two different sectors could be under the control of a different BTS, or both could be under the control of a single, common BTS. Two different BTSs (or a single, common BTS) could be under the control of the RAN device. Alternatively, one of the two different BTSs (or the single, common BTS) and the RAN device could be one and the same.

In any of the above configurations, the RAN device may be considered to be communicatively connected to the first and second wireless coverage zones. Moreover, the example configurations above are not intended to be limiting or exhaustive. Other configurations may be possible as well.

In accordance with example embodiments, determining both the first maximum air-interface coding rate and the second maximum air-interface coding rate at step 102 could correspond to determining a respective capacity utilization of each of the one or more carrier frequencies of the air interface of the first wireless coverage zone, and determining a respective capacity utilization of each of the one or more carrier frequencies of the air interface of the second wireless coverage zone. More particularly, each of one or more carrier frequencies of a given air interface can typically have a respective capacity for transmission of data in one or both directions. For example, the respective capacity could be measured in terms of a number of concurrent calls or communications sessions supported. Capacity could also be measured in terms of data volume transported per unit time. Capacity utilization then refers to a fraction (or percentage) of the capacity that is in use or being consumed at a given time. The air-interface coding rate supported on each of one or more carrier frequencies can depend, at least in part, on the capacity utilization of each, which could differ among the one or more carrier frequencies. Determination of a maximum air-interface coding rate supported on a given air interface can therefore include determining respective capacity utilizations of the one or more carrier frequencies of the given air interface.

In accordance with example embodiments, the example method illustrated in FIG. 1 can be applied communications in either or both directions between the first and second access terminals, and between each of the first and second access terminal and its respective wireless coverage zone. More particularly, determining both the first maximum air-interface coding rate and the second maximum air-interface coding rate at step 102 could correspond to determining the first maximum air-interface coding rate of a reverse link from the first access terminal, and determining the second maximum air-interface coding rate of a forward link to the second access terminal. In this case transmitting the instruction to each of the first access terminal and the second access terminal could correspond to transmitting a first instruction to the first access terminal to use the determined minimum air-interface coding rate for encoding communications on the reverse link, and transmitting a second instruction to the second access terminal to use the determined minimum air-interface coding rate for decoding communications on the forward link.

Additionally or alternatively, determining both the first maximum air-interface coding rate and the second maximum air-interface coding rate at step 102 could correspond to determining the first maximum air-interface coding rate of a forward link to the first access terminal, and determining the second maximum air-interface coding rate of a reverse link from the second access terminal. In this case transmitting the instruction to each of the first access terminal and the second access terminal could correspond to transmitting a first instruction to the first access terminal to use the determined minimum air-interface coding rate for decoding communications on the forward link, and transmitting a second instruction to the second access terminal to use the determined minimum air-interface coding rate for encoding communications on the reverse link.

In accordance with example embodiments, the communication session may be a voice call, in which case the first maximum air-interface coding rate could correspond to a first voice codec, and the second maximum air-interface coding rate could correspond to a second voice codec and encoding rate. Then determining a minimum air-interface coding rate at step 104 could correspond to determining a voice codec and encoding rate that will be used on the air interface of the first wireless coverage zone and the air interface of the second wireless coverage zone during the voice call.

Also in accordance with example embodiments, determining the first maximum air-interface coding rate from among the air-interface coding rates supported on each of the one or more carrier frequencies of the air interface of the first wireless coverage zone could include a determination of a first carrier frequency of the one or more carrier frequencies of the air interface of the first wireless coverage zone that supports the first maximum air-interface coding rate. That is, determining or identifying the carrier frequency of the first maximum air-interface coding rate can be part of determining the first maximum air-interface coding rate. Similarly, determining the second maximum air-interface coding rate from among the air-interface coding rates supported on each of the one or more carrier frequencies of the air interface of the second wireless coverage zone could include a determination of a second carrier frequency of the one or more carrier frequencies of the air interface of the second wireless coverage zone that supports the second maximum air-interface coding rate. Again, determining or identifying the carrier frequency of the second maximum air-interface coding rate can be part of determining the second maximum air-interface coding rate.

In further accordance with example embodiments, transmitting the instruction to the first access terminal to use the determined minimum air-interface coding rate for air-interface communications for the duration of the communication session could include instructing the first access terminal to use the determined first carrier frequency for the duration of the communication session. More specifically, the first access terminal could be operating on a first initial carrier frequency in the first wireless coverage zone when the determination of the first carrier frequency is made. The instruction to use the determined first carrier frequency could thus be intended to cause the first access terminal to switch (e.g., tune) to the first carrier frequency, if it is different from the first initial carrier frequency.

Likewise, transmitting the instruction to the second access terminal to use the determined minimum air-interface coding rate for air-interface communications for the duration of the communication session could include instructing the second access terminal to use the determined second carrier frequency for the duration of the communication session. Again, the second access terminal could be operating on a second initial carrier frequency in the second wireless coverage zone when the determination of the second carrier frequency is made. The instruction to use the determined second carrier frequency could thus be intended to cause the second access terminal to switch to the second carrier frequency, if it is different from the second initial carrier frequency.

The RAN device could transmit the respective instruction to either of the first and second access terminals either directly or via one or more intervening network components. For example, if the first and second wireless coverage zones are first and second sectors, respectively, and the RAN device is a BTS of the first or second sector (or of both if the first and second sectors are one and the same), then each instruction could be transmitted directly by the BTS to the first and second access terminals. As a further example, if the RAN device is a BSC that controls a BTS of each of the first and second sector, then the instructions could be sent to each BTS, which could then transmit the instruction to the respective access terminal. Other configurations are possible as well.

In accordance with example embodiments in which the wireless communication system is configured to operate according to CDMA2000 1× and/or CDMA2000 1× Advanced with codec support according to EVRC, including at least EVRC-B, air-interface coding rates may be assigned according to predefined Capacity Operating Point (COP) parameter values. In particular, COP-specified codec rates are used for voice calls. Under EVRC-B, COP parameter values may be defined in a range from a minimum COPs value to a maximum COPs value, where each COP parameter value is associated with a different coding rate. Larger COP parameter values are associated with smaller coding rates, and vice versa. For example, eight integer COP parameter values ranging from 0, . . . , 7 may be defined to specify coding rates that yield average data rates ranging from 6.93 kilobits per second (kbps) down to 3.75 kbps. COP parameter values are examples of symbolic labels that identify different coding rates.

By way of example, the first and second wireless coverage zones could be first and second wireless sectors, respectively, of the wireless communication system. Then, determination of the first and second maximum air-interface coding rates could correspond to determining COP parameter values in each sector. More specifically, determining the first maximum air-interface coding rate could correspond to determining a first carrier frequency of the first wireless sector that will support a coding rate corresponding to a first COP parameter value, based on capacity load conditions on each of the one or more carrier frequencies of the air interface of the first wireless sector. Similarly, determining the second maximum air-interface coding rate could correspond to determining a second carrier frequency of the second wireless sector that will support a coding rate corresponding to a second COP parameter value, based on capacity load conditions on each of the one or more carrier frequencies of the air interface of the second wireless sector.

In further accordance with example embodiments, determining the minimum air-interface coding rate from among the determined first maximum air-interface coding rate and the determined second maximum air-interface coding rate could correspond to determining a maximum COP parameter value from among the determined first COP parameter value and the determined second COP parameter value. The maximum COP parameter value would correspond to a minimum encoding rate, in correspondence with the explanation of COP parameters above. With this arrangement, transmitting the instruction to each of the first access terminal and the second access terminal to use the determined minimum air-interface coding rate for air-interface communications for a duration of the communication session could then correspond to instructing the first access terminal to use a coding rate corresponding to the determined maximum COP parameter value on the determined first carrier frequency for the voice call, and also instructing the second access terminal to use the coding rate corresponding to the determined maximum COP parameter value on the determined second carrier frequency for the voice call. By doing so, and end-to-end encoding rate for the voice, as signified by the maximum COP parameter value, would be determined and selected in a manner that helps ensure the highest possible encoding rate and call quality commensurate with available air interface resources as both ends of the voice call.

It will be appreciated that the steps of FIG. 1 are presented by way of example, and that additional and/or alternative steps or alternative ordering of steps could be carried out and still remain within the scope and spirit of the embodiments herein.

Figure 2:
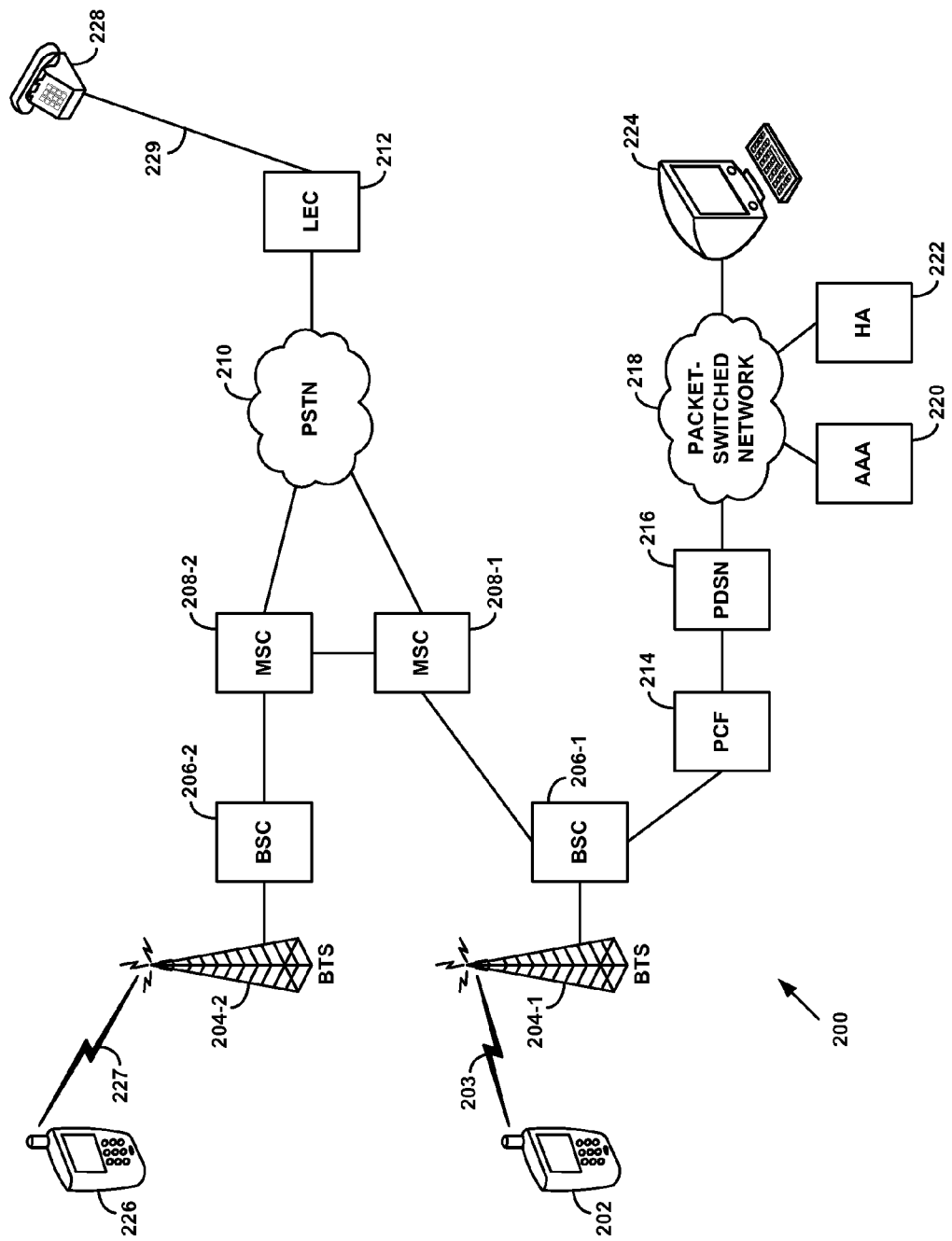
FIG. 2 is a simplified block diagram of a wireless communication system in which example embodiments of coordinating codec consistency based on cross-carrier assignment can be employed.

FIG. 2 shows a simplified block diagram of a wireless communication system 200 in which example embodiments of coordination codec consistency across wireless coverage areas could be employed. By way of example, an access terminal AT 202 communicates over an air interface 203 with a BTS 204-1, which is then coupled or integrated with a BSC 206-1. Transmissions over air interface 203 from BTS 204-1 to AT 202 represent the forward link to the access terminal (also referred to herein alternatively as the forward link from the base station, and as "the AT's forward link"). Transmissions over interface 203 from AT 202 to BTS 204-1 represent the reverse link (also referred to herein as "the AT's reverse link"). It will be appreciated that the arrangement shown in the figure is illustrative.

Also by way of example, a second access terminal AT 226 is depicted as communicating over an air interface 227 with a BTS 204-2, which is coupled or integrated with a BSC 206-2. Transmissions over air interface 227 from BTS 204-2 to AT 226 represent the forward link to the access terminal, and transmissions over interface 227 from AT 226 to BTS 204-2 represent the reverse link.

The BSC 206-1 is connected to MSC 208-1, which acts to control assignment of air traffic channels (e.g., over air interface 203), and provides access to wireless circuit-switched services such as circuit-voice and circuit-data (e.g., modem-based packet data) service. By way of example, the MSC 208-1 is shown as being connected to a second MSC region represented in the figure by the MSC 208-2, the BSC 206-2, and the BTS 204-2. Support for user mobility across MSC regions, as well as communications between AT in different MSC regions, is represented by the connection shown between the MSC 208-1 and 208-2. As represented by their respective connections to PSTN 210, MSCs 208-1 and 208-2 are also coupled with one or more telephony circuit switches, such as the Local Exchange Carrier (LEC) switch 212 in the operator's (or in a different operator's) network. The LEC 212 (or other form of landline switch) may support connectivity to landline subscribers, such as is represented by landline phone 228 connected via the end link 229.

As shown, BSC 206-1 is also connected with a PDSN 216 by way of packet control function (PCF) 214. PDSN 216 in turn provides connectivity with a packet-switched network 218, such as the Internet and/or a wireless carrier's private core packet-network. Sitting as nodes on network 218 are, by way of example, an authentication, authorization, and accounting (AAA) server 220, a mobile-IP home agent (HA) 222, and a remote computer 224. After acquiring an air traffic channel over its air interface, an access terminal (e.g., AT 202) may send a request to PDSN 216 for a connection in the packet data network. Then, following authentication of the access terminal by AAA server 220, the access terminal may be assigned an IP address by the PDSN or by HA 222, and may thereafter engage in packet-data communications with entities such as remote computer 224. Although not necessarily shown explicitly in FIG. 2, the BSC 208-2 may also provide a packet data connection to a packet switch network, such the network 218, for packet-data services.

It should be understood that the depiction of just one (or two) of each network element in FIG. 2 is illustrative, and there could be more than one (or two) of any of them, as well as other types of elements not shown. The particular arrangement shown in FIG. 2 should not be viewed as limiting with respect to the embodiments herein. Further, the network components that make up a wireless communication system such as system 200 are typically implemented as a combination of one or more integrated and/or distributed platforms, each comprising one or more computer processors, one or more forms of computer-readable storage (e.g., disks drives, random access memory, etc.), one or more communication interfaces for interconnection between elements and the network and operable to transmit and receive the communications and messages described herein, and one or more computer software programs and related data (e.g., machine-language instructions and program and user data) stored in the one or more forms of computer-readable storage and executable by the one or more computer processors to carry out the functions, steps, and procedures of the various embodiments of the present invention described herein. Similarly, a communication device such as exemplary access terminal 202 typically comprises a user-interface, I/O components, a transceiver, a communication interface, a tone detector, a processing unit, and data storage, all of which may be coupled together by a system bus or other mechanism. As such, system 200, ATs 202 and 226, air interfaces 203 and 227, landline phone 228, and end link 229 are representative of exemplary means of implementing and carrying out the various functions, steps, and procedures described herein.

Throughout this description, the term "base station" will be used to refer to a Radio Access Network (RAN) element or RAN device such as a BTS, a BSC, or combination BTS/BSC, for instance. The term "radio network controller" (RNC) can also be used to refer to a BSC, or more generally to a base station. In some arrangements, two or more RNCs may be grouped together, wherein one of them carries out certain control functions of the group, such as coordinating handoffs across BTSs of the respective RNCs in the group. The term controlling RNC (or C-RNC) customarily applies to the RNC that carries out these (and possibly other) control functions.

1. Conventional CDMA Communications

In a conventional CDMA wireless network compliant with the well known IS-2000 standard, each cell employs one or more carrier frequencies, typically 1.25 MHz in bandwidth each, and each wireless service sector is distinguished from adjacent sectors by a pseudo-random number offset ("PN offset"). Further, each sector can concurrently communicate on multiple different channels, distinguished from each other by "Walsh codes." When an access terminal operates in a given sector, communications between the access terminal and the BTS of the sector are carried on a given frequency and are encoded by the sector's PN offset and a given Walsh code.

Air interface communications are divided into forward link communications, which are those passing from the base station to the access terminal, and reverse link communications, which are those passing from the access terminal to the base station. In an IS-2000 system, data are transmitted in units of frames on both the forward link and reverse link. On either link, communications in a given wireless service sector are encoded with the sector's PN offset and a given Walsh code. On the forward link, certain Walsh codes are reserved for use to define control channels, including a pilot channel, a sync channel, and one or more paging channels, and the remainder can be assigned dynamically for use as traffic channels, i.e., to carry user communications. Similarly, on the reverse link, one or more Walsh codes may be reserved for use to define access channels, and the remainder can be assigned dynamically for use as traffic channels.

In order to facilitate efficient and reliable handoff of access terminals between sectors, under IS-2000 an AT can communicate on a given carrier frequency with a number of "active" sectors concurrently, which collectively make up the AT's "active set." Depending on the system, the number of active sectors can be up to six (currently). The access terminal receives largely the same signal from each of its active sectors and, on a frame-by-frame basis, selects the best signal to use. An AT's active set is maintained in the access terminal's memory, each active sector being identified according to its PN offset. The AT continually monitors the pilot signals from its active sectors as well as from other sectors, which may vary in as the AT moves about within the wireless communication system, or as other factors cause the AT's RF conditions to change. The AT reports the received signal strengths to the serving base station, which then directs the AT to update its active set in accordance with the reported strengths and one or more threshold conditions.

In order to support concurrent communication in multiple channels on a common frequency, each channel is allocated a fraction of the total forward-link power available in the sector. The power allocated to each channel is determined so as to optimize the signal-to-noise characteristics of all the channels, and may vary with time according to the number of access terminals being serviced, and their relative positions with respect to the BTS, among other factors. Similarly, on the reverse links, each access terminal transmits at a power level that optimizes the signal-to-noise while minimizing interference with other access terminals.

With arrangement described above, an access terminal can engage in cellular voice or packet-data communications. Referring again to FIG. 2, and taking an originating call from AT 202 as an example, AT 202 first sends an origination request over air interface 203 and via the BTS 204-1 and BSC 206-1 to MSC 208-1. The MSC then signals back to the BSC directing the BSC to assign an air interface traffic channel for use by the access terminal. For a voice call, the MSC uses well-known circuit protocols to signal call setup and establish a circuit connection to a destination switch that can then connect the call to a called device (e.g., landline phone or another access terminal).

For a packet-data session, the BSC 206-1 signals to the PDSN 216 by way of PCF 214. The PDSN 216 and access terminal 202 then negotiate to establish a data link layer connection, such as a point to point protocol (PPP) session. Further, the PDSN 216 sends a foreign agent advertisement that includes a challenge value to the access terminal, and the access terminal responds with a mobile-IP registration request (MIP RRQ), including a response to the challenge, which the PDSN forwards to HA 222. The HA then assigns an IP address for the access terminal to use, and the PDSN passes that IP address via the BSC to the access terminal.

2. High Rate Packet-Data Communications

Under IS-2000, the highest rate of packet-data communications theoretically available on a fundamental traffic channel of the forward link is 9.6 kbps, dependent in part on the power allocated to the forward-link traffic channel and the resultant signal-to-noise characteristics. In order to provide higher rate packet-data service to support higher bandwidth applications, the industry introduced a new "high rate packet data (HRPD) system," which is defined by industry standard IS-856.

IS-856 leverages the asymmetric characteristics of most IP traffic, in which the forward link typically carries a higher load than the reverse link. Under IS-856, each access terminal maintains and manages an active set as described above, but receives forward-link transmission from only one active sector at a time. In turn, each sector transmits to all its active ATs on a common forward link using time division multiplexing (TDM) in order to transmit to only one access terminal at a time, but at the full power of the sector. As a result of the full-power allocation by the sector, an access terminal operating under IS-856 can, in theory, receive packet-data at a rate of at least 38.4 kbps and up to 2.4 Mbps on its forward link.

The reverse link under IS-856 retains largely the traditional IS-2000 code division multiplexing (CDM) format, albeit with the addition of a "data rate control" (DRC) channel used to indicate the supportable data rate and best serving sector for the forward link. Multiple, active ATs in a common serving sector can transmit concurrently on their respective reverse links to the sector's BTS. Each reverse link comprises distinct code channels, thereby enabling the BTS to distinguish among each AT's transmissions. As with IS-2000, the IS-856 reverse link transmissions are frame-based. Unlike the IS-856 forward link which is allocated the full power of the serving sector (or other coverage area) to each AT on a TDM basis, the power applied to the reverse link from each of possibly multiple ATs in a common serving sector is individually controlled by the base station using the same methods described above for IS-2000.

TDM access on the IS-856 forward link is achieved by dividing the forward link in the time domain into time slots of length 2048 chips each. At a chip rate of 1.228 Mega-chips per second, each slot has a duration of 1.67 milliseconds (ms). Each time slot is further divided into two 1024-chip half-slots, each half-slot arranged to carry a 96-chip pilot "burst" (pilot channel) at its center and a Medium Access Control (MAC) channel in two 64-chip segments, one on each side of the pilot burst. The remaining 1600 chips of each time slot (800 per half-slot) are allocated for a forward traffic channel or a forward control channel, so that any given time slot will carry either traffic-channel data (if any exists) or control-channel data. Traffic-channel data comprise user application data, while control-channel data comprise IS-856 control messages. As in IS-2000, each sector in IS-856 is defined by a PN offset, and the pilot channel carries an indication of the sector's PN offset. Also as in IS-2000, an access terminal operating under IS-856 monitors the pilot signal emitted by various sectors in order to facilitate active set management, i.e., as a basis to facilitate handoff from one sector to another.

Operation in an IS-856 compliant communication system may be illustrated, again with reference to FIG. 2. To acquire packet data connectivity under IS-856, after an access terminal first detects an IS-856 carrier, the access terminal 202 sends to its BSC (or RNC) 206-1 a UATI (Universal Access Terminal Identifier) request, and receives in response an UATI, which the access terminal can then use to identify itself in subsequent communications with the BSC. The access terminal then sends a connection-request to the BSC 206-1, and the BSC responsively invokes a process to authenticate the access terminal and to have the access terminal acquire a data link.

In particular, the BSC 206-1 sends an access request to an Access Network AAA (ANAAA) server (which may be different than the AAA server 220), and the ANAAA server authenticates the access terminal. The BSC 206-1 then assigns radio resources for the data session, providing a MAC identifier ("MAC ID") to the AT for identifying its time-slot data sent in the forward-link traffic channel, and a Walsh code for a sending data on the reverse-link traffic channel. Further, the BSC 206-1 signals to the PDSN 216 (via PCF 214), and the PDSN and access terminal then negotiate to establish a PPP data link. In addition, as in the IS-2000 process, the access terminal then sends an MIP RRQ to the PDSN, which the PDSN forwards to the HA 222, and the HA assigns a mobile-IP address for the access terminal to use.

Once the access terminal has acquired an IS-856 radio link, a data link, and an IP address, the access terminal is considered to be in an active mode. In active mode, the AT receives its data distributed across MAC-identified time slots transmitted by the BTS using the full power of the forward link of the sector selected by the AT (as described above). Thus, the access terminal recognizes its time-slot data from among other time slots by a MAC identifier included in each transmission, and processes only those time slots with the AT's assigned MAC identifier. Using the full power of the forward link maximizes the signal-to-noise ratio, thus facilitating higher rate data communication than the power-limited conventional CDMA channels.

3. Coordinating Codec Consistency Based on Assignment Across Carrier Frequencies When a communication session, such as a voice call, is set up with an access terminal operating in a wireless communication system, a forward link from the base station (or other RAN device, such as a BTS or BSC) to the access terminal, and a reverse link from the access terminal to the base station, is established on an air interface between the access terminal and the base station. For a voice call, in particular, a voice encoder and encoding rate may be selected by the base station (or other RAN element) for each of the forward link and the reverse link. Higher encoding rates may provide higher quality but also transmit at higher power, while lower encoding rates may provide lower quality, but also transmit at lower power. Since forward and reverse link transmissions can contribute to RF interference in a sector (and possibly neighboring sectors), RF interference in a sector will tend to increase with the number of access terminals engaging in communications (e.g., capacity loading), and with the respective transmission power levels on their respective forward and reverse links. Accordingly, selection of the voice encoder may be based, at least in part, on RF conditions and/or capacity loading conditions in the cell or sector (or other form of wireless coverage zone) in which the access terminal is operating when the voice call is set up.

More particularly, under CDMA2000 1x, codec support may be specified according to the EVRC-B standard for voice codecs. As described above EVRC-B defines eight different encoding rates, each identified according to different COP parameter value. Table 1 lists the COP parameters values (first column) and corresponding channel encoding rates (second column), source encoding rates (third column), and average data rates (fourth column). The average data rates include bits for silence intervals.

TABLE 1

| COP | Channel Rate (kbps) | Source Rate (kbps) | Average Rate (kbps) |
| --- | --- | --- | --- |
| 0 | 9.3 | 8.3 | 6.93 |
| 1 | 8.5 | 7.57 | 6.42 |
| 2 | 7.5 | 6.64 | 5.52 |
| 3 | 7.0 | 6.18 | 5.24 |
| 4 | 6.6 | 5.82 | 4.82 |
| 5 | 6.2 | 5.45 | 4.62 |
| 6 | 5.8 | 5.08 | 4.45 |
| 7 | 4.8 | 4.0 | 3.75 |

As can be seen, lower COP values correspond to higher data rates, and vice versa. Generally, COPs 0-3 specify encoding rates that yield the highest voice quality, but requires the highest transmission powers. COP 4 specifies encoding rate that yield voice quality comparable to EVRC, but requires slightly lower transmission power than EVRC, while COPs 5-7 specify encoding rates that yield the lower voice quality than EVRC, but requires even lower transmission powers.

Under EVRC-B, the base station may select one of the COP values when a voice call is set up, and instruct the access terminal to use that value on its forward and reverse links. The access terminal may then use the corresponding encoding rate on its forward and reverse links. It is also possible for the access terminal to change COP values, and corresponding coding rates, during the course of a voice call, for example as the access terminal hands off to different sectors or cells. In practice, however, a change in voice quality as COP values change can be perceived by the user as distracting and/or annoying. Consequently, a fixed COP value is typically selected for the duration of a voice call.

A voice call (or other type of communication session) between two access terminals will typically include a respective air-interface communicative connection between the access terminal at either end of the call and a respective BTS (or other RAN element) of that access terminal's serving cell or sector. Customarily, a call is said to originate from a "near end" and terminate at a "far end," where the terms "originate" and "terminate" are used in a topological sense. In a usual case, call origination (at the near end) can also correspond to the initial source of the call (e.g., by way of a call request from an originating access terminal), and call termination can correspond to the destination or target of the call (as specified in the call request, for example). Thus, a call between access terminals includes a respective air interface at each of the near end and far end, each respective air interface having a respective pair of forward and reverse links. As noted above, access terminals at the near and far ends could be in the same or different cells or sectors.

As part of the setup of a new AT-to-AT call (or other type of communication session), encoding/decoding rates are assigned for both the near end and far end air interfaces. For a voice call, this is done by assigning a respective COP parameter value at each end. In practice, the serving BTS or BSC of the near-end access terminal may determine a COP value based on load conditions (or other RF operating conditions) on the carrier frequency assigned to the near-end AT in its serving sector or cell. More specifically, the near end AT may initially be in an idle state on an assigned carrier frequency in its serving sector when a call set up is invoked (e.g., by a request from the AT). The AT's assigned carrier frequency may be one of multiple carrier frequencies supported by the air interface of the serving sector. While in the idle state, the AT may not necessarily be engaged in an active communication session or voice call, but can still receive page messages and the like on its assigned carrier frequency from its serving sector, and can send messages to its serving sector on its assigned carrier frequency. In this state, the AT is said to be "idling" on its carrier.

In conventional operation, the BTS or BSC at the originating end will select a COP value based on capacity loading conditions only in the originating sector and only on the carrier frequency assigned to the idling near-end access terminal. However, such conventional assignment of COP value fails to account for capacity loading conditions (or other RF operating conditions) in the terminating sector, and ignores potentially more favorable conditions on carrier frequencies other than that of the idling near-end access terminal. Accordingly, coordinating codec consistency based on assignment across carrier frequencies at both ends of a call or communication session could lead to more efficient allocation of network resources, as well as generally better call quality.

a. Example Operation

In accordance with example embodiments, codecs can be coordinated and assigned at each end of a call or communication session between access terminals by taking account of coding rates supported on carrier frequencies at each end of the call or communication session. More particularly, a RAN device, such as a BTS or BSC (for example), at the originating end of a call can make a determination of coding rates supported by each of one or more carrier frequencies in both the originating and terminating cell or sector. The RAN device can then select a coding rate that provides the highest rate supported at both ends. The selected coding rate can then be communicated to the access terminals at each end of the call.

Figure 3A:
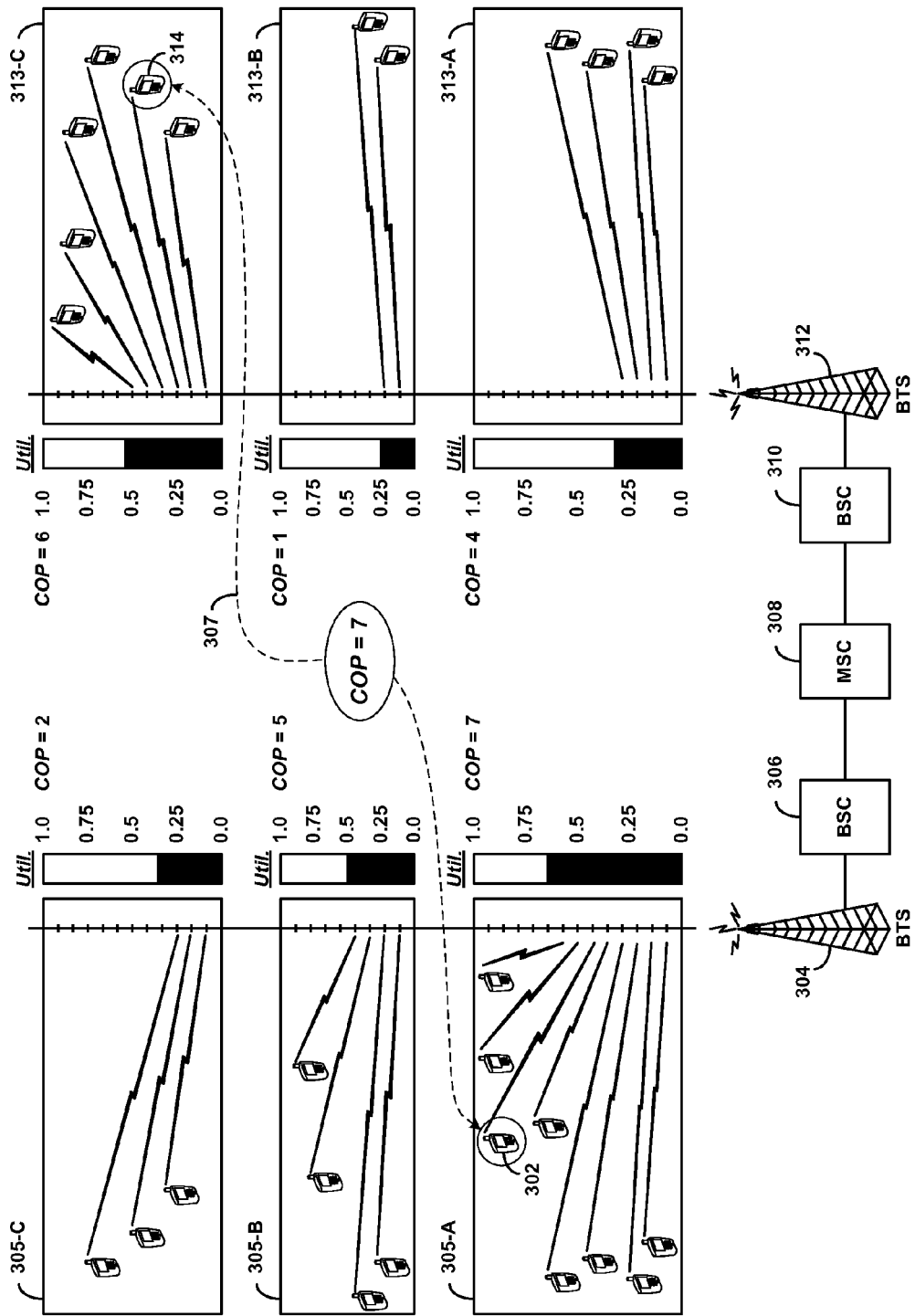
FIG. 3A illustrates example phases of operation of coordination of codec consistency based on cross-carrier assignment in a wireless communication system, in accordance with example embodiments.
Figure 3B:
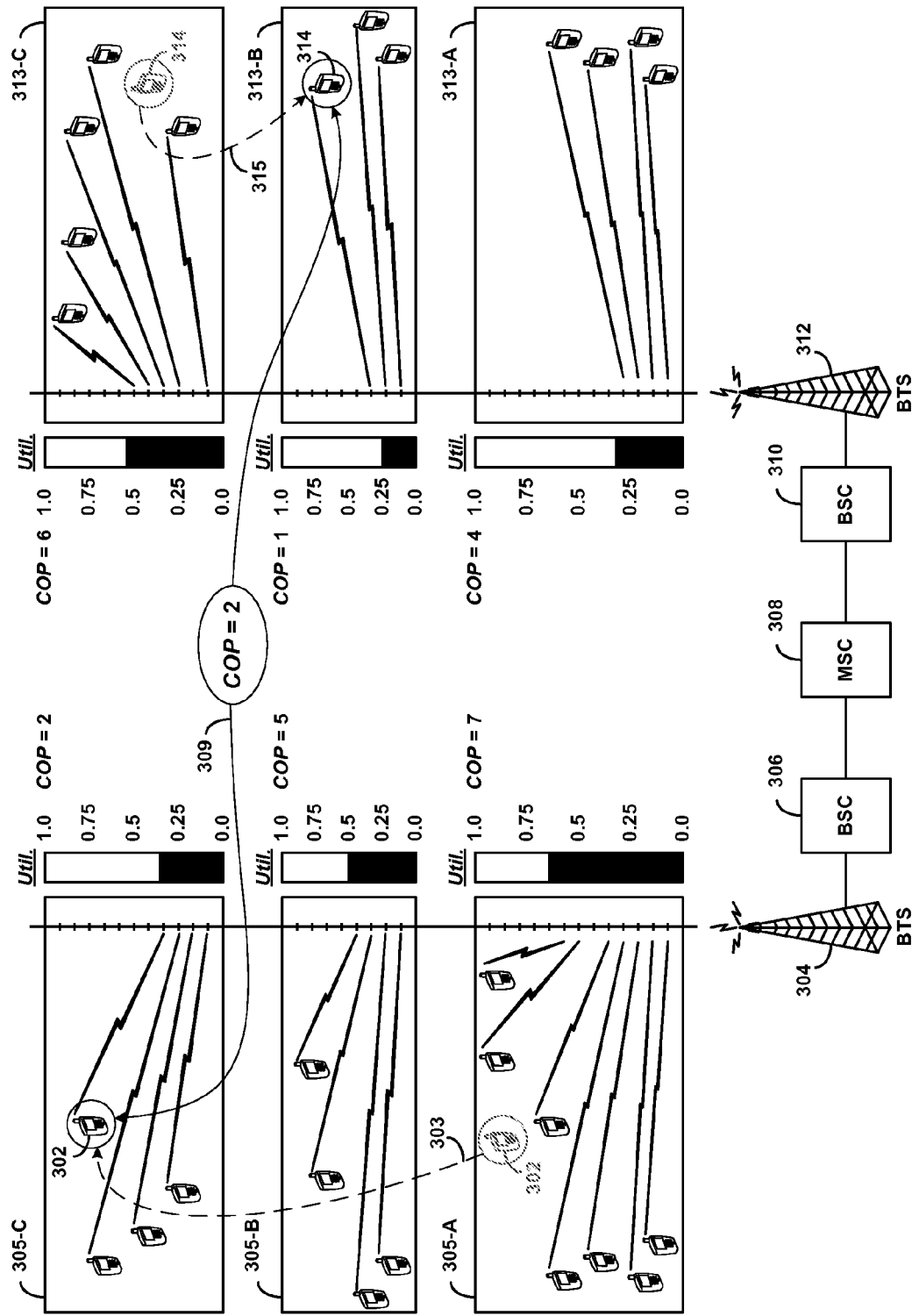
FIG. 3B illustrates addition example phases of operation of coordination of codec consistency based on cross-carrier assignment in a wireless communication system, in accordance with example embodiments.

FIGS. 3A and 3B illustrate example operation of coordination of codec consistency based on cross-carrier assignment for a voice call between two access terminals in a wireless communication system. By way of example, FIGS. 3A and 3B show a first BTS 304 connected with a first controlling BSC 306, and a second BTS 312 connected with a second controlling BSC 310. The BSCs 306 and 310 are communicatively connected by way of a MSC 308. The particular configuration illustrated should not be viewed as limiting with respect to example embodiments described herein, and there is no loss in generality by considering only the configuration shown in FIGS. 3A and 3B.

Also by way of example, the air interface of the BTS 304 is shown as supporting three carrier frequency bands 305-A, 305-B, and 305-C. Similarly, and also by way of example, the BTS 312 is shown as supporting three carrier frequency bands 313-A, 313-B, and 313-C. Each of the carrier frequency bands is represented as a rectangle having a height symbolic of a one or another form of capacity (e.g., bandwidth). A number of tick marks on a vertical line at one horizontal end of the rectangle signify capacity of the carrier frequency band. Tick marks could, for instance, represent communication channels. For purposes of illustration, band 305-A has the largest capacity (most tick marks) for the BTS 304, followed by band 305-C, and then band 305-B. Similarly, band 313-A has the largest capacity for the BTS 312, followed by band 313-C, and then band 313-B. Also for purposes of illustration bands 305-A and 313-A are depicted as having the same capacity; similarly, 305-B and 313-B are depicted as having the same capacity, and 305-C and 313-C are depicted as having the same capacity. This arrangement is illustrative, and should not be viewed as limiting with respect to example embodiments described herein. Also, the number of tick marks in each band is illustrative, and not necessarily intended to signify an actual number of channels (or other capacity metric) in a specific deployment.

The different carrier bands supported by each BTS could correspond, for example, to different portions within specific frequency bands of the RF spectrum allocated for cellular wireless communications. For example, the RF spectrum from 870 to 890 MHz (part of the so-called "800 MHz Cellular Spectrum") contains two bands, designated "A" and "B," for forward-link transmissions. The RF spectrum from 1930 to 1990 MHz (part of the so-called "1900 MHz PCS Spectrum") contains six forward-link bands, designated as "A" through "F." Similar subdivisions in adjacent bands at lower frequencies can be used for reverse links. In a cellular wireless communication system, bands can be configured to contain one or more non-overlapping 1.25 MHz-wide carriers. Each carrier can then serve multiple CDMA or TDMA channels. The number of channels supported on a given carrier can be one metric of capacity, as described below. Other configurations of carrier frequencies and/or carrier bands are possible as well.

Utilization within each carrier band is symbolized by one or more access terminals each having a respective air interface terminating at a tick mark in the band. As shown, air interfaces are represented by lightning-bolt lines. In this symbolic depiction, utilization in a given band corresponds to the number of access terminals (or air interfaces) shown in the given band, relative to the capacity of the given band as represented by the number of tick marks. In addition, a respective utilization "gauge" in the form of a bar graph is displayed next to each band (just to the right of bands 305-A, 305-B, and 305-C, and just to the left of bands 313-A, 313-B, and 313-C). Each utilization gauge is labeled "Util." and has markings at 0.0, 0.25, 0.5, 0.75, and 1.0 fractional utilization points (or in terms of percentages, 0, 25, 50, 75, and 100). A respective black vertical fill-line signifies the utilization of each gauge.

A COP value is also displayed for each band in FIGS. 3A and 3B. As described above, the coding rate supported in a given band (as labeled by a COP value) can be based, at least in part, on the utilization within the band. By way of example, band 305-A is shown to be at approximately 0.63 (63%) utilization and supports a COP value of 7 (i.e., a relatively low-rate codec). Also by way of example, band 305-B is shown to be at approximately 0.5 (50%) utilization, and supports a COP value of 5 and band 305-C is shown to be at approximately 0.25 (25%) utilization and supports a COP value of 2. For the BTS 312, band 313-A is shown to be at approximately 0.3 (30%) utilization and supports a COP value of 4, band 313-B is shown to be at approximately 0.25 (25%) utilization, and supports a COP value of 1, and band 313-C is shown to be at approximately 0.5 (50%) utilization, and supports a COP value of 6.

It will be appreciated that the example values displayed are illustrative of a correlation between utilizations and COP values, but do not necessarily represent actual correlations that might be used in a deployment. Moreover, a wireless communication system could use factors other than just utilization to determine the codec and/or COP value(s) supported on a given band. Non-limiting examples of other factors could include RF noise and/or interference. Factors could also be interrelated to some extent. For example, as a metric of load, capacity utilization can also be indicative of a volume of data traffic carried on RF channels, which in turn can be related expected or actual interference. Accordingly, the correlation between utilization and COP value illustrated in FIGS. 3A and 3B should not be viewed as either necessarily exclusive of other possible factors or limiting with respect to example embodiments herein.

Further to the example operation illustrated in FIGS. 3A and 3B, an originating access terminal 302 in band 305-A of the BTS 304 may request a call to a terminating access terminal 314 in band 313-C of the BTS 312. For example, the access terminal 302 may be idling on the carrier frequency of band 305-A and the access terminal 314 may be idling on the carrier frequency of band 313-C when access terminal 302 issues a call request. In conventional operation, the near-end (originating) BTS 304 (or near-end BSC 306) will determine (for this example) that the new call should be assigned a COP value of 7, the value supported by band 305-A when the call request is received. This aspect of conventional operation is overlaid on FIG. 3A for purposes of illustration and contextual reference. Specifically, a wavey dashed double arrow 307 labeled "COP=7" points between access terminal 302 and access terminal 314. However, operation according example embodiments departs from the conventional approach in FIGS. 3A and 3B.

The illustration of example operation continues in FIG. 3B, which shows how a determination of a highest coding rate (lowest COP value) at each of the near-end and far-end sectors (BTSs) can be used to assign a more favorable COP value for the requested call. More particularly, upon receiving a call request to set up a new voice call (or other form of communication session) between the access terminals 302 and 314, the BTS 304 (or BSC 306) could determine that among the three frequency bands supported by the BTS 304, band 305-C supports the lowest COP value (COP=2), and correspondingly the highest rate codec at the near end. The BTS 304 (or BSC 306) could also determine that among the three frequency bands supported by the BTS 312, band 313-B supports the lowest COP value (COP=1), and correspondingly the highest rate codec at the far end.

For circumstances in which the originating BTS may not be in direct communication or control of the far-end access terminal (as in the present example illustrated in FIGS. 3A and 3B), the originating BTS may communicate with the terminating BTS (or other RAN element) at the far end in order to learn or determine what carrier bands may be available to the far end access terminal and what COP values are supported on each band. For example, upon receiving a request from a near-end access terminal to setup call with a far-end access terminal, the originating BTS may carry out call control procedures, including message exchanges with the terminating BTS, which could provide the necessary far-end carrier band information.

In further accordance with example embodiments, the BTS 304 (or BSC 306) could then select the lower rate codec (higher COP value) of the two highest rate codecs at the near and far ends. This selection helps balance the maximum rate codec against the rate that can be accommodated end-to-end. Thus, for the current example, the near end BTS 304 could select a COP value of 2. In doing so, the near end BTS 304 will also have identified respective target carrier frequency bands that should be used at both ends of the call in order to support the selected COP value (and codec). For this particular example, each of the near end and far end access terminals 302 and 314 are seen to be idling on different carriers than the respectively identified target carriers for COP=2 when the call request is received. Accordingly, both access terminals 302 and 314 will need execute a "frequency handoff" to the target carrier in their respective sector in order to best support using the selected codec.

In still further accordance with example embodiments, the near end BTS 302 (or BSC 306) can instruct the near end access terminal 302 to handoff to the carrier band 305-C, in addition to assigning COP=2. Similarly, the near end BTS 302 (or BSC 306) can instruct the far end access terminal 314 to handoff to the carrier band 313-B, also in addition to assigning COP=2. Depending on whether the target carrier frequency is higher or lower than the one that each access terminal is idling when the call request is received by the near end BTS 304, each access terminal may "hand up" to a higher carrier frequency or "hand down" to a lower carrier frequency. Procedures for frequency hand up and hand down are well known, and not discussed further here.

Frequency handoffs of access terminals 302 and 314 are illustrated conceptually in FIG. 3B. A dashed arrow 303 represents a switch in carrier of access terminal 302 from band 305-A to band 305-C. As a visual cue, the access terminal 302 is shown in gray in band 305-A, and without the air interface shown in FIG. 3A. The arrow 303 points to access terminal 302 with an air interface in the target band 305-C. A similar carrier switch is shown for the access terminal 314. Namely, a dashed arrow 315 represents a switch in carrier of access terminal 314 from band 313-C to band 313-B. Again as a visual cue, the access terminal 314 is shown in gray in band 313-C, and without the air interface shown in FIG. 3A. The arrow 315 points to access terminal 314 with an air interface in the target band 313-B.

After the near and far end access terminals 302 and 314 hand up or down to their respective target carriers, they can be assigned COP=2. This aspect of operation is signified in FIG. 3B by a wavey solid double arrow 309 labeled "COP=2" that points between access terminal 302 and access terminal 314, each now in their respective target bands. The requested call can thus be set up with each access terminal assigned to a more favorable COP value (and corresponding codec) than might otherwise be possible under conventional operation. It will be appreciate that the specific outcome of operation according to example embodiments can vary according to the particular circumstances. Accordingly, coordination of codec consistency based on cross-carrier assignment may result in more marked increase in assigned codec rate, and correspondingly more significantly improved call quality, in some instances than in others. However, operation according to example embodiments can always at least determine if conditions for better call quality and more efficient use of network resources based on cross-carrier selection exist.

In further accordance with example embodiments, an instruction for an access terminal to hand up or hand down in order to be able to be assigned a particular COP value may take various forms. At the near end, the originating BTS 304 could transmit a message including both the assigned COP value and a frequency handoff command with the near-end target frequency to the near-end access terminal 302. For the far-end access terminal 314, the originating BTS 304 could transmit a message to the terminating BTS 312, including both the assigned COP value and a far-end target frequency. The far end BTS 312 could then transmit a message including both the assigned COP value and a frequency handoff the far-end target frequency command to the far-end access terminal 314.

In the arrangement illustrated in FIGS. 3A and 3B, the near BTS 304 and the far BTS 312 are different, as are their controlling BSCs (306 and 310, respectively). In addition, the two BTSs are connected via the MSC 308. In this case, the near end BTS 304 (or BSC 306) may determine the lowest COP value at the far end by communicating with far end BTS 312 (or BSC 310), for example. It will be appreciated that other arrangements and other paths of communication between near end and far end network elements are possible as well, as was described earlier in connection with method illustrated in FIG. 1. Accordingly, the specific network elements involved in carrying out the example method, as well as the specific messages exchanged, may vary according to logistical circumstances of the access terminals when call setup is invoked. The example operation illustrated in FIGS. 3A and 3B and discussed above should not be viewed as limiting with respect to example embodiments described herein. In addition, it is contemplated that the methods and operations described by way of example above could be extended to include more than just two access terminals in a communication session. For example, set up of a new call could include a determination of a best carrier and codec rate from among three or more access terminals being connected by way of the new call.

b. Example RAN Device

Figure 4:
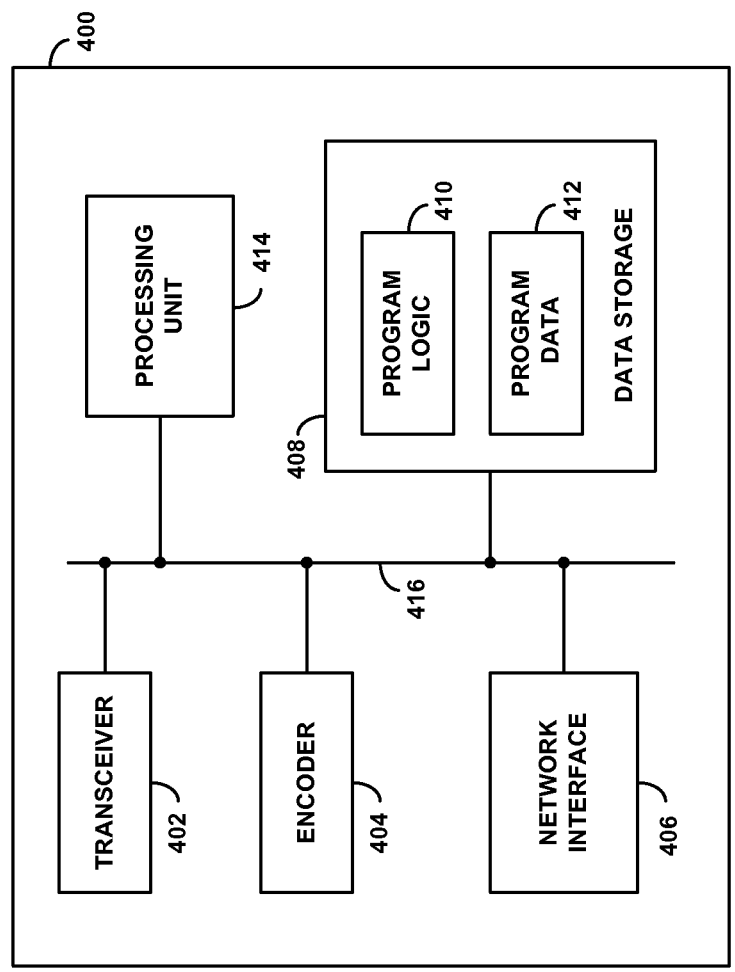
FIG. 4 is a block diagram of an example RAN device in which an example method of coordination of codec consistency based on cross-carrier assignment could be implemented.

The example embodiments of coordinating codec consistency based on assignment across carrier frequencies described above can be implemented as methods in a RAN device, such as a BSC, RNC, base station, or MSC, for example. The discussion above of FIG. 1 provides an example of such a method. FIG. 4 is a block diagram depicting functional components of an example RAN device in which an example method of coordination codec consistency across wireless coverage areas could be implemented. As shown in FIG. 4, the RAN device 400, representative of BSC 206-1 or 206-2, or BSC 206-1 integrated with BTS 204-1 or BSC 206-2 integrated with BTS 204-2, in FIG. 2, for instance, includes a transceiver 402, a encoder 404, network interface 406, a processing unit 414, and data storage 408, all of which may be coupled together by a system bus 416 or other mechanism. In addition, the RAN device may also include external storage, such as magnetic or optical disk storage, although this is not shown in FIG. 4.

These components may be arranged to support conventional operation in a wireless communication network that is compliant with a CDMA family of protocols, such as network 200 illustrated in FIG. 2. The details of such an arrangement and how these components function to provide conventional operation are well-known in the art, and are not described further herein.

Network interface 406 enables communication on a network, such network 200. As such, network interface 406 may take the form of trunk or optical link that can be coupled with one or more other a TDM switches (e.g., other MSCs or trunk switches) such as MSC 208-1 or 208-2. The network interface 406 could also take the form of an Ethernet network interface card or other physical connection, among other possibilities, for connection to a packet device, such as PCF 214, for instance. Further, network interface 406 in combination with encoder 404 and transceiver 402, which may include one or more BTS antennas, enables air interface communication with one or more access terminals on air-interface forward and reverse links, thereby supporting methods of coordination codec consistency across wireless coverage areas described herein.

Processing unit 414 comprises one or more general-purpose processors (e.g., INTEL microprocessors) and/or one or more special-purpose processors (e.g., dedicated digital signal processor, application specific integrated circuit, etc.). In turn, the data storage 408 comprises one or more volatile and/or non-volatile storage components, such as magnetic or optical memory or disk storage. Data storage 408 can be integrated in whole or in part with processing unit 414, as cache memory or registers for instance. As further shown, data storage 408 is equipped to hold program logic 410 and program data 412.

Program logic 410 may comprise machine language instructions that define routines executable by processing unit 414 to carry out various functions described herein. In particular the program logic, communication interface, and encoder may operate cooperatively to carry out logical operation such as that discussed above. Further, program data 412 may be arranged to store data used in conjunction with the logical operations described above.

It will be appreciated that there can be numerous specific implementations of a network switch, such as RAN device 400, in which a method of coordinating codec consistency based on assignment across carrier frequencies could be implemented. Further, one of skill in the art would understand how to devise and build such an implementation. As such, RAN device 400 is representative of means for carrying out coordinating codec consistency based on assignment across carrier frequencies, in accordance with the functions and steps described herein by way of example.

5. Conclusion

An exemplary embodiment of the present invention has been described above. Those skilled in the art will understand, however, that changes and modifications may be made to this embodiment without departing from the true scope and spirit of the invention, which is defined by the claims.

We claim:

1. A method implemented in a radio access network (RAN) device of a wireless communication system, wherein air-interface coding rates are assigned according to predefined capacity parameters, the method comprising:

in response to receiving a request to set up a communication session between a first access terminal operating in a first wireless coverage zone and a second access terminal operating in a second wireless coverage zone, determining both (i) a first maximum air-interface coding rate from among air-interface coding rates supported on each of one or more carrier frequencies of an air interface of the first wireless coverage zone, and (ii) a second maximum air-interface coding rate from among air-interface coding rates supported on each of one or more carrier frequencies of an air interface of the second wireless coverage zone;

determining a minimum air-interface coding rate from among the determined first maximum air-interface coding rate and the determined second maximum air-interface coding rate; and transmitting an instruction to each of the first access terminal and the second access terminal to use the determined minimum air-interface coding rate for air-interface communications for a duration of the communication session, wherein the communication session is a voice call, wherein the wireless communication system is configured to operate according to at least Enhanced Variable Rate Codec B (EVRC-B), including assignment of air-interface coding rates identified by predefined Capacity Operating Point (COP) parameter values ranging from a minimum COPs value to a maximum COPs value, wherein the first wireless coverage zone is a first wireless sector of the wireless communication system and the second wireless coverage zone is a second wireless sector of the wireless communication system, and wherein determining both the first maximum air-interface coding rate and the second maximum air-interface coding rate comprises:

based on capacity load conditions on each of the one or more carrier frequencies of the air interface of the first wireless sector, determining a first carrier frequency of the first wireless sector that will support a coding rate corresponding to a first COP parameter value; and based on capacity load conditions on each of the one or more carrier frequencies of the air interface of the second wireless sector, determining a second carrier frequency of the second wireless sector that will support a coding rate corresponding to a second COP parameter value.

2. The method of claim 1, wherein the first wireless coverage zone and the second wireless coverage zone are the same.

3. The method of claim 1, wherein determining both the first maximum air-interface coding rate and the second maximum air-interface coding rate further comprises:

determining a respective capacity utilization of each of the one or more carrier frequencies of the air interface of the first wireless coverage zone; and determining a respective capacity utilization of each of the one or more carrier frequencies of the air interface of the second wireless coverage zone.

4. The method of claim 1, wherein determining both the first maximum air-interface coding rate and the second maximum air-interface coding rate further comprises determining the first maximum air-interface coding rate of a reverse link from the first access terminal, and the second maximum air-interface coding rate of a forward link to the second access terminal, and wherein transmitting the instruction to each of the first access terminal and the second access terminal comprises:

transmitting a first instruction to the first access terminal to use the determined minimum air-interface coding rate for encoding communications on the reverse link; and transmitting a second instruction to the second access terminal to use the determined minimum air-interface coding rate for decoding communications on the forward link.

5. The method of claim 1, wherein determining both the first maximum air-interface coding rate and the second maximum air-interface coding rate further comprises determining the first maximum air-interface coding rate of a forward link to the first access terminal, and the second maximum air-interface coding rate of a reverse link from the second access terminal, and wherein transmitting the instruction to each of the first access terminal and the second access terminal comprises:

transmitting a first instruction to the first access terminal to use the determined minimum air-interface coding rate for decoding communications on the forward link; and transmitting a second instruction to the second access terminal to use the determined minimum air-interface coding rate for encoding communications on the reverse link.

6. The method of claim 1, wherein the first maximum air-interface coding rate corresponds to a first voice codec and the second maximum air-interface coding rate corresponds to a second voice codec and encoding rate, and wherein determining a minimum air-interface coding rate comprises determining a voice codec and encoding rate that will be used on the air interface of the first wireless coverage zone and the air interface of the second wireless coverage zone during the voice call.

7. The method of claim 1, wherein determining both (i) the first maximum air-interface coding rate from among the air-interface coding rates supported on each of the one or more carrier frequencies of the air interface of the first wireless coverage zone, and (ii) the second maximum air-interface coding rate from among the air-interface coding rates supported on each of the one or more carrier frequencies of the air interface of the second wireless coverage zone comprises:

determining a first carrier frequency of the one or more carrier frequencies of the air interface of the first wireless coverage zone that supports the first maximum air-interface coding rate; and determining a second carrier frequency of the one or more carrier frequencies of the air interface of the second wireless coverage zone that supports the second maximum air-interface coding rate.

8. The method of claim 7, wherein transmitting the instruction to each of the first access terminal and the second access terminal to use the determined minimum air-interface coding rate for air-interface communications for the duration of the communication session comprises:

instructing the first access terminal to use the determined first carrier frequency for the duration of the communication session; and instructing the second access terminal to use the determined second carrier frequency for the duration of the communication session.

9. The method of claim 1, wherein determining the minimum air-interface coding rate from among the determined first maximum air-interface coding rate and the determined second maximum air-interface coding rate comprises determining a maximum COP parameter value from among the determined first COP parameter value and the determined second COP parameter value, and wherein transmitting the instruction to each of the first access terminal and the second access terminal to use the determined minimum air-interface coding rate for air-interface communications for a duration of the communication session comprises:

instructing the first access terminal to use a coding rate corresponding to the determined maximum COP parameter value on the determined first carrier frequency for the voice call; and instructing the second access terminal to use the coding rate corresponding to the determined maximum COP parameter value on the determined second carrier frequency for the voice call.

10. A radio access network (RAN) device of a wireless communication system, wherein air-interface coding rates are assigned according to predefined capacity parameters, the RAN device comprising:

one or more processors;

memory accessible by the one or more processors; and computer-readable instructions stored in the memory that upon execution by the one or more processors cause the RAN device to carry out functions including:

in response to receiving a request to set up a communication session between a first access terminal operating in a first wireless coverage zone and a second access terminal operating in a second wireless coverage zone, determining both (i) a first maximum air-interface coding rate from among air-interface coding rates supported on each of one or more carrier frequencies of an air interface of the first wireless coverage zone, and (ii) a second maximum air-interface coding rate from among air-interface coding rates supported on each of one or more carrier frequencies of an air interface of the second wireless coverage zone, determining a minimum air-interface coding rate from among the determined first maximum air-interface coding rate and the determined second maximum air-interface coding rate, and transmitting an instruction to each of the first access terminal and the second access terminal to use the determined minimum air-interface coding rate for air-interface communications for a duration of the communication session, wherein the communication session is a voice call, wherein the wireless communication system is configured to operate according to at least Enhanced Variable Rate Codec B (EVRC-B), including assignment of air-interface voice codecs identified by predefined Capacity Operating Point (COP) parameter values ranging from a minimum COPs value to a maximum COPs value, wherein the first wireless coverage zone is a first wireless sector of the wireless communication system and the second wireless coverage zone is a second wireless sector of the wireless communication system, wherein determining both the first maximum air-interface coding rate and the second maximum air-interface coding rate comprises:

based on capacity load conditions on each of the one or more carrier frequencies of the air interface of the first wireless sector, determining a first carrier frequency of the first wireless sector that will support a voice codec corresponding to a first COP parameter value; and based on capacity load conditions on each of the one or more carrier frequencies of the air interface of the second wireless sector, determining a second carrier frequency of the second wireless sector that will support a voice codec corresponding to a second COP parameter value, wherein determining the minimum air-interface coding rate from among the determined first maximum air-interface coding rate and the determined second maximum air-interface coding rate comprises determining a maximum COP parameter value from among the determined first COP parameter value and the determined second COP parameter value, and wherein transmitting the instruction to each of the first access terminal and the second access terminal to use the determined minimum air-interface coding rate for air-interface communications for a duration of the communication session comprises:

instructing the first access terminal to use a voice codec corresponding to the determined maximum COP parameter value on the determined first carrier frequency for the voice call; and instructing the second access terminal to use the voice codec corresponding to the determined maximum COP parameter value on the determined second carrier frequency for the voice call.

11. The RAN device of claim 10, wherein the first wireless coverage zone and the second wireless coverage zone are the same.

12. The RAN device of claim 10, wherein determining both the first maximum air-interface coding rate and the second maximum air-interface coding rate further comprises determining the first maximum air-interface coding rate of at least one of a forward link or a reverse link between the first access terminal and the first wireless coverage zone, and determining the second maximum air-interface coding rate of at least one of a forward link or a reverse link between the second access terminal and the second wireless coverage zone, and wherein transmitting the instruction to each of the first access terminal and the second access terminal comprises:

transmitting a first instruction to the first access terminal to use the determined minimum air-interface coding rate for at least one of decoding communications on a forward link to the first access terminal, or encoding communications on a reverse link from the first access terminal; and transmitting a second instruction to the second access terminal to use the determined minimum air-interface coding rate for at least one of decoding communications on a forward link to the second access terminal, or encoding communications on a reverse link from the second access terminal.

13. The RAN device of claim 10, wherein determining both (i) the first maximum air-interface coding rate from among the air-interface coding rates supported on each of the one or more carrier frequencies of the air interface of the first wireless coverage zone, and (ii) the second maximum air-interface coding rate from among the air-interface coding rates supported on each of the one or more carrier frequencies of the air interface of the second wireless coverage zone comprises:

based on a respective capacity utilization of each of the one or more carrier frequencies of the air interface of the first wireless coverage zone, determining a first carrier frequency of the one or more carrier frequencies of the air interface of the first wireless coverage zone that supports the first maximum air-interface coding rate; and based on a respective capacity utilization of each of the one or more carrier frequencies of the air interface of the second wireless coverage zone, determining a second carrier frequency of the one or more carrier frequencies of the air interface of the second wireless coverage zone that supports the second maximum air-interface coding rate, and wherein transmitting the instruction to each of the first access terminal and the second access terminal to use the determined minimum air-interface coding rate for air-interface communications for the duration of the communication session comprises:

instructing the first access terminal to use the determined first carrier frequency for the duration of the communication session; and instructing the second access terminal to use the determined second carrier frequency for the duration of the communication session.

14. A non-transitory computer-readable medium having instructions stored thereon that, upon execution by one or more processors of a radio access network (RAN) device of a wireless communication network in which air-interface coding rates are assigned according to predefined capacity parameters, cause the RAN device to carry out functions including:

in response to receiving a request to set up a communication session between a first access terminal operating in a first wireless coverage zone and a second access terminal operating in a second wireless coverage zone, determining both (i) a first maximum air-interface coding rate from among air-interface coding rates supported on each of one or more carrier frequencies of an air interface of the first wireless coverage zone, and (ii) a second maximum air-interface coding rate from among air-interface coding rates supported on each of one or more carrier frequencies of an air interface of the second wireless coverage zone;

determining a minimum air-interface coding rate from among the determined first maximum air-interface coding rate and the determined second maximum air-interface coding rate; and transmitting an instruction to each of the first access terminal and the second access terminal to use the determined minimum air-interface coding rate for air-interface communications for a duration of the communication session, wherein the communication session is a voice call, wherein the wireless communication system is configured to operate according to at least Enhanced Variable Rate Codec B (EVRC-B), including assignment of air-interface voice codecs identified by predefined Capacity Operating Point (COP) parameter values ranging from a minimum COPs value to a maximum COPs value, wherein the first wireless coverage zone is a first wireless sector of the wireless communication system and the second wireless coverage zone is a second wireless sector of the wireless communication system, wherein determining both the first maximum air-interface coding rate and the second maximum air-interface coding rate comprises:

based on capacity load conditions on each of the one or more carrier frequencies of the air interface of the first wireless sector, determining a first carrier frequency of the first wireless sector that will support a voice codec corresponding to a first COP parameter value; and based on capacity load conditions on each of the one or more carrier frequencies of the air interface of the second wireless sector, determining a second carrier frequency of the second wireless sector that will support a voice codec corresponding to a second COP parameter value, wherein determining the minimum air-interface coding rate from among the determined first maximum air-interface coding rate and the determined second maximum air-interface coding rate comprises determining a maximum COP parameter value from among the determined first COP parameter value and the determined second COP parameter value, and wherein transmitting the instruction to each of the first access terminal and the second access terminal to use the determined minimum air-interface coding rate for air-interface communications for a duration of the communication session comprises:

instructing the first access terminal to use a voice codec corresponding to the determined maximum COP parameter value on the determined first carrier frequency for the voice call; and instructing the second access terminal to use the voice codec corresponding to the determined maximum COP parameter value on the determined second carrier frequency for the voice call.

15. The non-transitory computer-readable medium of claim 14, wherein the first wireless coverage zone and the second wireless coverage zone are the same.

16. The non-transitory computer-readable medium of claim 14, wherein determining both the first maximum air-interface coding rate and the second maximum air-interface coding rate further comprises determining the first maximum air-interface coding rate of at least one of a forward link or a reverse link between the first access terminal and the first wireless coverage zone, and determining the second maximum air-interface coding rate of at least one of a forward link or a reverse link between the second access terminal and the second wireless coverage zone, and wherein transmitting the instruction to each of the first access terminal and the second access terminal comprises:

transmitting a first instruction to the first access terminal to use the determined minimum air-interface coding rate for at least one of decoding communications on a forward link to the first access terminal, or encoding communications on a reverse link from the first access terminal; and transmitting a second instruction to the second access terminal to use the determined minimum air-interface coding rate for at least one of decoding communications on a forward link to the second access terminal, or encoding communications on a reverse link from the second access terminal.

17. The non-transitory computer-readable medium of claim 14, wherein determining both (i) the first maximum air-interface coding rate from among the air-interface coding rates supported on each of the one or more carrier frequencies of the air interface of the first wireless coverage zone, and (ii) the second maximum air-interface coding rate from among the air-interface coding rates supported on each of the one or more carrier frequencies of the air interface of the second wireless coverage zone comprises:

based on a respective capacity utilization of each of the one or more carrier frequencies of the air interface of the first wireless coverage zone, determining a first carrier frequency of the one or more carrier frequencies of the air interface of the first wireless coverage zone that supports the first maximum air-interface coding rate; and based on a respective capacity utilization of each of the one or more carrier frequencies of the air interface of the second wireless coverage zone, determining a second carrier frequency of the one or more carrier frequencies of the air interface of the second wireless coverage zone that supports the second maximum air-interface coding rate, and wherein transmitting the instruction to each of the first access terminal and the second access terminal to use the determined minimum air-interface coding rate for air-interface communications for the duration of the communication session comprises:

instructing the first access terminal to use the determined first carrier frequency for the duration of the communication session; and instructing the second access terminal to use the determined second carrier frequency for the duration of the communication session.

* * * * *